Sept. 11, 1923.                H. S. HOLMES                1,467,792
                             UNITING METAL PARTS
                             Filed Oct. 14, 1921

Inventor
HENRY S. HOLMES
By his Attorney
D. Anthony Usina

Patented Sept. 11, 1923.

1,467,792

UNITED STATES PATENT OFFICE.

HENRY S. HOLMES, OF NEW YORK, N. Y., ASSIGNOR TO THOMAS E. MURRAY, OF BROOKLYN, NEW YORK.

UNITING METAL PARTS.

Application filed October 14, 1921. Serial No. 507,738.

*To all whom it may concern:*

Be it known that I, HENRY S. HOLMES, a citizen of the United States, and resident of the city, county, and State of New York, have invented certain new and useful Improvements in Uniting Metal Parts, of which the following is a specification.

This invention consists of a method by which the edges of plates, segments, and other parts may be welded together with the aid of an electric current of comparatively low total amperage, while utilizing a method requiring a comparatively high current density per square inch of metal traversed. This operation permits welding by the known method of passing a current of very high amperage for a very short period of time, generally less than one second, the parts being pressed together while the metal is heated and softened by such current; and permits the use of this method in the welding of large areas with a comparatively small supply of current. For this purpose the edges, or similar faces, to be joined are first partially welded by the pressure method described or by similar pressure methods and the weld is completed in a second operation, generally by one of the several methods known of adding metal which is fused to the parts to be united.

The accompanying drawings illustrate applications of the method.

Figure 1:
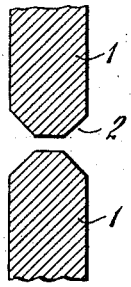
Figs. 1 and 2 are a cross-section and side elevation respectively of two plates which are to be united at their edges.
Figure 2:
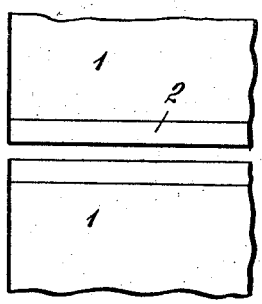
Figure 3:
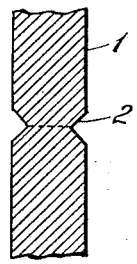
Figs. 3 and 4 are cross-sectional views of the same indicating successive stages of the operation.
Figure 4:
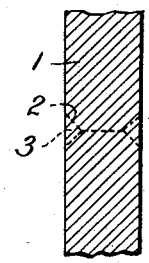

Referring to the embodiments of the invention illustrated the plates 1, Figs. 1 and 2, are to be united along their edges but these edges are of such width and length that a good weld cannot be secured over the entire area with ordinary electric equipment. The edges are, therefore, beveled at the corners as indicated at 2 so as to reduce the area at the joint. They are then brought together as in Fig. 3 and the available current passed through them so that under pressure a good weld is secured partially across the width. The next operation is to complete the weld, and for this purpose an arc is used to provide a filling 3 of molten metal in the spaces at the edges left by the first operation, this metal being welded by fusion to the faces 2 of the plates. After introduction of the metal 3 it may be ground or otherwise smoothed off to form a continuation of the faces of the plates 1.

Figure 5:
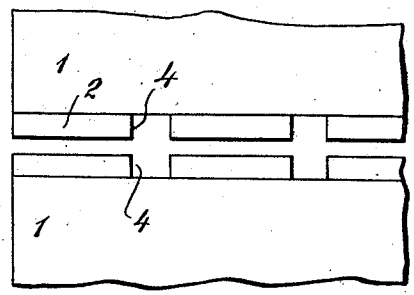
Fig. 5 is a side elevation showing a modification.

In a previous patent of T. E. Murray, No. 1,363,161, December 21, 1920, a method is described in which the edges of the plates are cut away at intervals across their entire width and the first stage of the welding operation unites the plates at separated points along their edges. The present method has an advantage in that the filling of molten metal can be applied more easily and that the weld by fusion is more reliable where it is applied along the beveled edges 2 and does not have to pass completely from one side to the other of the plates. However, the present method may be modified also, as shown in Fig. 5, by leaving a complete open space across the width of the plate at intervals as indicated at 4 in Fig. 5. The remaining portions of the edges of the plates are provided with the bevels 2, the same as in Fig. 1.

Figure 6:
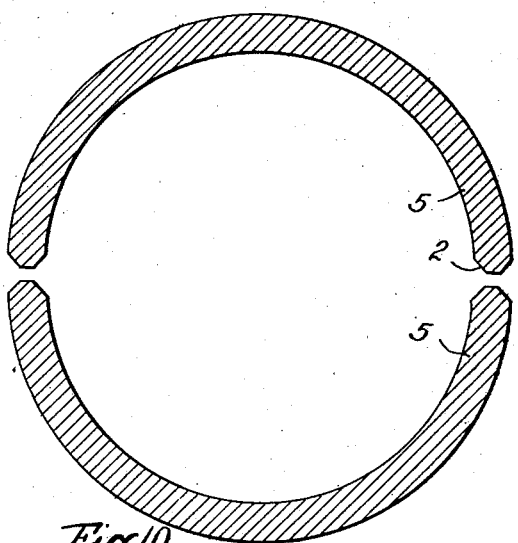
Fig. 6 is a cross-section illustrating the application of the process to the uniting of two segments.

Fig. 6 illustrates the same process as Fig. 1, uniting the segments 5 at both edges to form a tubular product.

Figure 7:
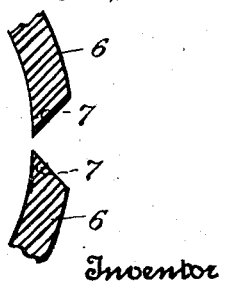
Fig. 7 is a similar view of an alternative method.

The reduction in width of the edges, as by bevels 2, may be made on one side only of the joint, instead of on both sides as indicated in Fig. 1, and in fact the edges may be beveled from one side completely across the width, as for the segments 6 in Fig. 7 so that when brought together they will be welded across the width indicated by the dotted lines 7, and will leave a trough at the outside to be subsequently filled with welded molten metal.

Figure 8:
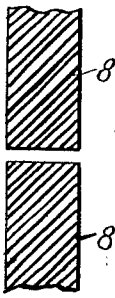
Figs. 8, 9 and 10 are cross-sections of successive stages of a modification of the process.
Figure 9:
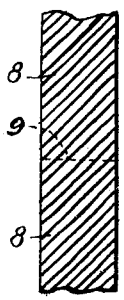
Figure 10:

A partial weld may be secured also without beveling the edges. Figs. 8, 9 and 10 show plates 8 with ordinary flat edges. These plates are brought together and the maximum current applied for a short interval so that the pressure of the parts together effects a weld along the line 9. Assuming that the current supply is not sufficient to secure a perfect weld, we have nevertheless a partial weld which can be reinforced and thus made to serve the desired purpose. The reinforcement is effected as shown in Fig. 9 by applying molten metal 10 to the meeting faces of the two plates 8 and welding this added body of metal by fusion to the two plates. In some cases it will be sufficient to place the reinforcement at one side only of the joint.

The arc or fusion method of welding described does not require a very large current. It can be applied with the use of the same electric equipment which is used for the first partial weld by the high current method.

Though I have described with great particularity of detail certain specific embodiments of my invention, yet it is not to be understood therefrom that the invention is restricted to the specific details disclosed. Various modifications may be made by those skilled in the art without departure from the invention as defined in the following claims.

What I claim is—

1. The method of uniting metal parts which comprises first making a partial butt weld of the edges to be joined and then making a complete weld of the same edges at the same points in the length of such edges.

2. The method of uniting metal parts which comprises first making a partial butt weld under pressure of the edges to be joined and then completing the welding of the edges at the same points in their length by fusion.

3. The method of uniting the edges of metal parts which comprises reducing the width of such edges and then welding the reduced edges and filling the space left by such reduction in width with additional metal welded thereto.

4. The method of uniting metal parts which comprises first making a partial weld of the edges to be joined by pressing them together for a very brief interval of time with the passage of an electric current of high amperage, and in a separate operation making a complete weld of the edges at the same points in the length of such edges.

5. The method of uniting metal parts which comprises first making a partial butt weld of the edges to be joined and then reinforcing the joint at the same points in the length of such edges.

In witness whereof I have hereunto signed my name.

HENRY S. HOLMES.